UNITED STATES PATENT OFFICE.

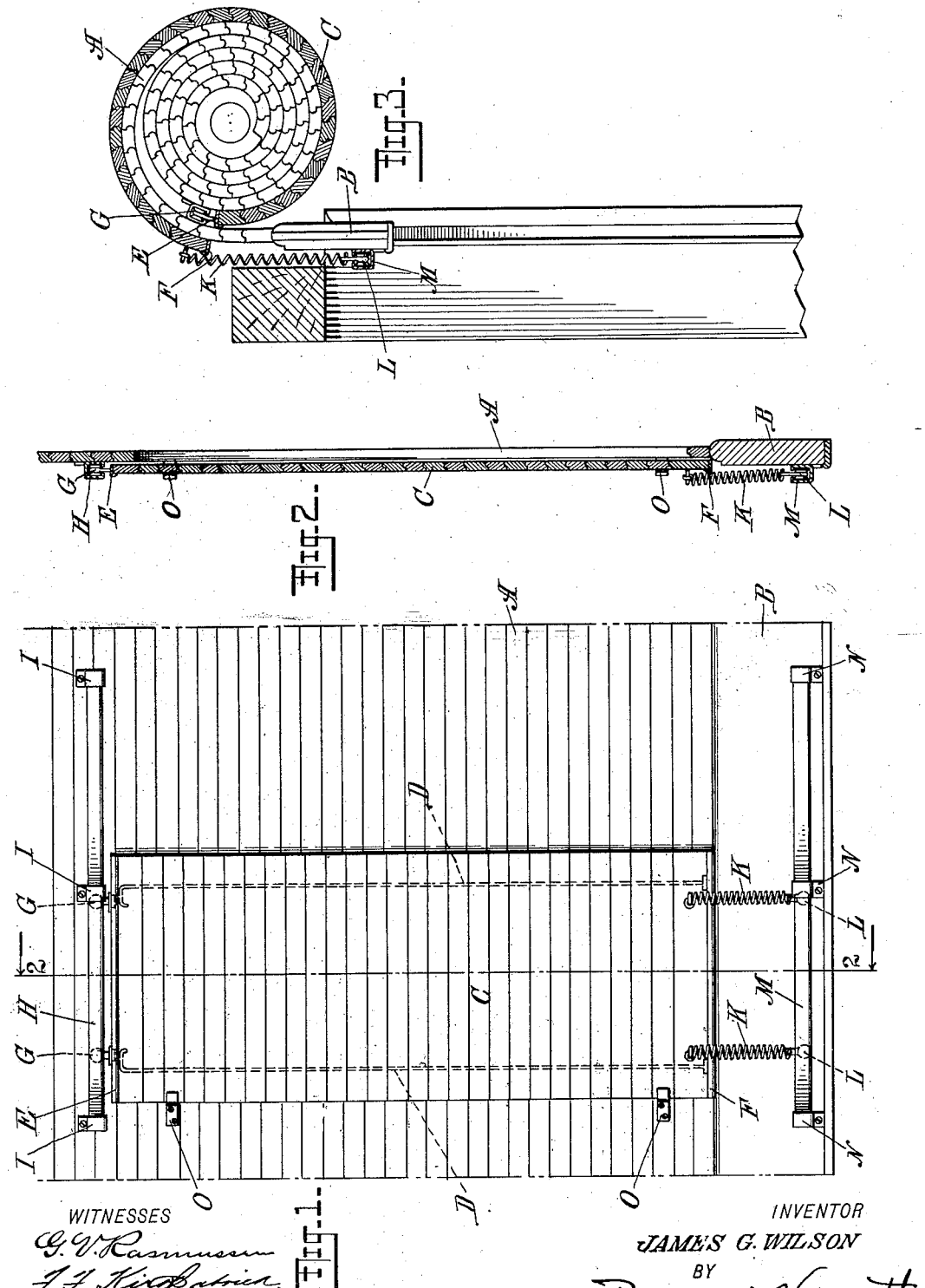

JAMES G. WILSON, OF LARCHMONT, NEW YORK.

ROLLING SHUTTER.

No. 888,862.  Specification of Letters Patent.  Patented May 26, 1908.

Application filed February 7, 1908. Serial No. 414,777.

*To all whom it may concern:*

Be it known that I, JAMES G. WILSON, a subject of the King of Great Britain, and a resident of Larchmont, Westchester county, New York, have invented certain new and useful Improvements in Rolling Shutters, of which the following is a specification.

My invention relates to rolling shutters for warehouse and roundhouse doors; and the object of my improvement is to provide such shutters with a wicket, so as to make it unnecessary to raise the entire shutter in order to admit persons through the doorway.

In the drawings Figure 1 is a front view of a portion of a rolling shutter, showing the wicket; Fig. 2 is a section on the line 2—2 of Fig. 1; and Fig. 3 is a cross section of the roller, shutter and wicket when the shutter is raised to its highest position.

In the drawings, A represents a portion of a rolling shutter made, for instance, of wooden slats, in the usual manner.

B is the baseboard to which the lower portion of the shutter is attached.

C is a wicket which may be constructed of slats like the shutter; this wicket covers a small doorway opening in the shutter indicated in the sectional view shown in Fig. 2. Iron or steel bars E, F, form the top and bottom respectively of the wicket and support heavy wires D, D, upon which the slats composing the wicket are strung. The wicket is hung by trolleys G, G, to a trolley track H, which is supported upon the shutter by brackets I, I. The lower portion of the wicket is connected by helical springs K, K, to trolleys L, L, running in a trolley track M, which in turn is fastened to the baseboard B by brackets N. Right angle stops O are attached to the shutter to limit the movement of the wicket after it has covered the opening, and to prevent bulging of the wicket in a strong wind. The wicket can be opened or closed by pushing the same sidewise, the trolleys G, G, and L, L, sliding easily in their respective trolley tracks.

When the shutter is wound up and the wicket begins to assume a curved position, the springs K, K, will yield sufficiently to allow for the longer radius of curvature of the wicket. When the shutter is lowered, the springs will gradually pull the wicket into its normal operative position.

The construction shown and described illustrates one embodiment of my invention, but many changes may be made in said structure without departing from the spirit of my invention.

I claim:

1. The combination with a rolling shutter containing an opening of a flexible wicket adapted to be rolled up with and upon said rolling shutter, and means for permitting said wicket to be slid parallel to said shutter towards and away from said opening.

2. The combination with a rolling shutter containing an opening of a flexible wicket adapted to be rolled up with and upon said rolling shutter, guideways mounted upon said shutter above and below said opening, anti-friction rollers within said guideways, and connections between said wicket and said roller.

3. The combination with the rolling shutter containing an opening of a flexible wicket adapted to be rolled up with and upon said rolling shutter, guideways mounted upon said shutter above and below said opening, anti-friction rollers within said guideways, connections between said wicket and said rollers, the connections between the wicket and the rollers in one of said guideways being elastic.

4. The combination with the roller shutter containing an opening of a flexible wicket adapted to be rolled up with and upon said shutter, the trolley track mounted upon the shutter above said opening, and carrying trolleys united with the top of said wicket, a trolley mounted upon the shutter below said wicket, and containing trolleys connected with the lower portion of said wicket by means of springs.

In witness whereof I have hereunto set my hand in the presence of two subscribing witnesses, this 3rd day of February, 1908.

JAMES G. WILSON.

Witnesses:
 W. E. DUNCANSAN,
 A. H. DODGE.